United States Patent
Lanpher

(12)
(10) Patent No.: US 6,382,114 B1
(45) Date of Patent: May 7, 2002

(54) CONSERVATION FARMING STRIP TILL NITROGEN APPLICATOR

(76) Inventor: Paul Lanpher, 32598 County Rd. 309, Advance, MO (US) 63730

( * ) Notice: Subject to any disclaimer, the term of this patent is extended or adjusted under 35 U.S.C. 154(b) by 0 days.

(21) Appl. No.: 09/461,777

(22) Filed: Dec. 15, 1999

(51) Int. Cl.⁷ .............................................. A01C 23/00
(52) U.S. Cl. ........................ 111/124; 111/139; 111/191
(58) Field of Search ................................ 111/118, 124, 111/139, 191

(56) References Cited

U.S. PATENT DOCUMENTS

| | | | | |
|---|---|---|---|---|
| 3,742,877 A | * | 7/1973 | Coffee ........................ | 111/191 |
| 5,477,792 A | * | 12/1995 | Bassett et al. .............. | 111/121 |
| 5,495,814 A | * | 3/1996 | Primus ........................ | 111/124 |
| 5,645,000 A | * | 7/1997 | Carroll ........................ | 111/195 |
| 5,657,707 A | * | 8/1997 | Dresher et al. ............. | 111/139 |
| 5,865,131 A | * | 2/1999 | Dietrich, Sr. et al. ....... | 111/121 |
| 5,970,891 A | * | 10/1999 | Schlagel ...................... | 111/135 |
| 5,970,892 A | * | 10/1999 | Wendling et al. ........... | 111/139 |
| 6,029,590 A | * | 2/2000 | Arriola et al. ............... | 111/124 |
| 6,038,990 A | * | 3/2000 | Simpson ...................... | 111/124 |
| 6,167,821 B1 | * | 1/2001 | Beggs ......................... | 111/124 |

* cited by examiner

*Primary Examiner*—Christopher J. Novosad
(74) *Attorney, Agent, or Firm*—Mark Manley

(57) ABSTRACT

A combination strip-tiller and applicator is disclosed for conservation farming. The machine is designed to save soil, fertilizer, labor and fuel while producing a higher yield. Unique features of the device include a knife that injects anhydrous ammonia or other chemicals in a broad band under the seedbed. This broad band allows seeds to be planted in the same pass or within a few days without risk of fertilizer burn to the seedlings. The knife also loosens the soil and raises the seedbed. Row cleaners and cultivator gangs can run in the same pass to remove excess crop residual and to further raise the seedbed.

2 Claims, 2 Drawing Sheets

CONSERVATION FARMING STRIP TILL NITROGEN APPLICATOR

BACKGROUND OF THE INVENTION

It is common in the farming industry to use conservation techniques such as strip tilling to reduce soil erosion. Strip tilling involves tilling one strip of soil while leaving the next strip, where no crops are to be planted, untilled. In addition to soil erosion the technique saves on labor and equipment.

As part of the effort to control labor and the costs of planting it is common practice to combine several operations such as tilling and applying fertilizer in one pass. It would be desirable to combine the steps of tilling, application of liquid fertilizer and planting into one pass but in the past this has been impractical because the liquid fertilizer would burn the seedlings.

Fertilizer burn occurs if concentrated liquid fertilizer gets on the seeds or seedlings. This will occur if liquid fertilizer, applied in a single stream, does not have time to spread out through the soil. Often fertilizer is applied in one pass and seeds are planted in a second pass several months later. Often the fertilizer application is done in the fall and seeds are planted in the spring. This technique tends to result in fertilizer ground water contamination and is being restricted in many states. Another technique is broad band application of the fertilizer on the surface of the soil but this technique tends to be wasteful as liquid fertilizer evaporates away very quickly if left exposed and again the technique tends to lead to over-application and ground water contamination. An additional consideration in tilling is to remove just enough of the old plant material to foster growth in the new seedling but to not remove too much old plant material as this would allow for excess erosion to get started.

Another consideration for many plants is to build a raised seed bed. In the spring, when planting occurs it is often wet. Too much moisture will cause seeds to rot in the ground and will stunt the growth of seedlings. For these reasons it is often desirable to build a slightly raised seed bed. This allows the ground immediately surrounding the seed to drain away any excess moisture while still retaining enough moisture for seed germination.

Prior art strip till equipment uses cultor wheels, followed by a conventional anhydrous knife, which is in turn followed by disc plows. This prior art arrangement has some limitations. The wavy coulter wheels are designed to chop up old vegetation but they tend to compact the deep soil as they lift the top layer. The prior art anhydrous knives can only loosen soil in a very narrow row perhaps 3 inches wide. The discs pulled behind tend to pull some soil back onto the row but again tend to pack the soil. A disadvantage of the use of discs is that they create a rut that contributes to erosion.

SUMMARY OF THE INVENTION

The invention relates generally to strip tillage and to the application of liquid fertilizer. A knife is disclosed that allows for liquid fertilizer to be applied under the seedbed in a broad band. This technique overcomes problems of delays in planting associated with waiting for liquid fertilizer to dissipate through the soil and problems with fertilizer losses associated with broad band surface applications. The technique also overcomes the serious problem of ground water contamination resulting from over application of fertilizer in the fall for spring plantings.

In applying anhydrous the material is a liquid under high pressure in the tank. When the anhydrous is applied, and pressure is released in turns to a gas. If the gas is not under the soil it will simply dissipate into the air. An advantage of the current invention is that it injects the anhydrous through a knife in a wide band that is typically 5–8 inches below the soil. Thus the anhydrous is contained and a minimum of loss occurs.

Old plant material is removed from the seedbed but not from the entire row. This way the old plant material provides some buffer against soil erosion.

The knife that allows for the application of fertilizer under the seedbed also tends to loosen the seedbed and to raise the seedbed. Rolling cultivators can be added to further raise the bed.

The invention can be mounted on a wheel-supported toolbar or on a toolbar mounted on a three-point hitch.

DESCRIPTION

Figure 1:
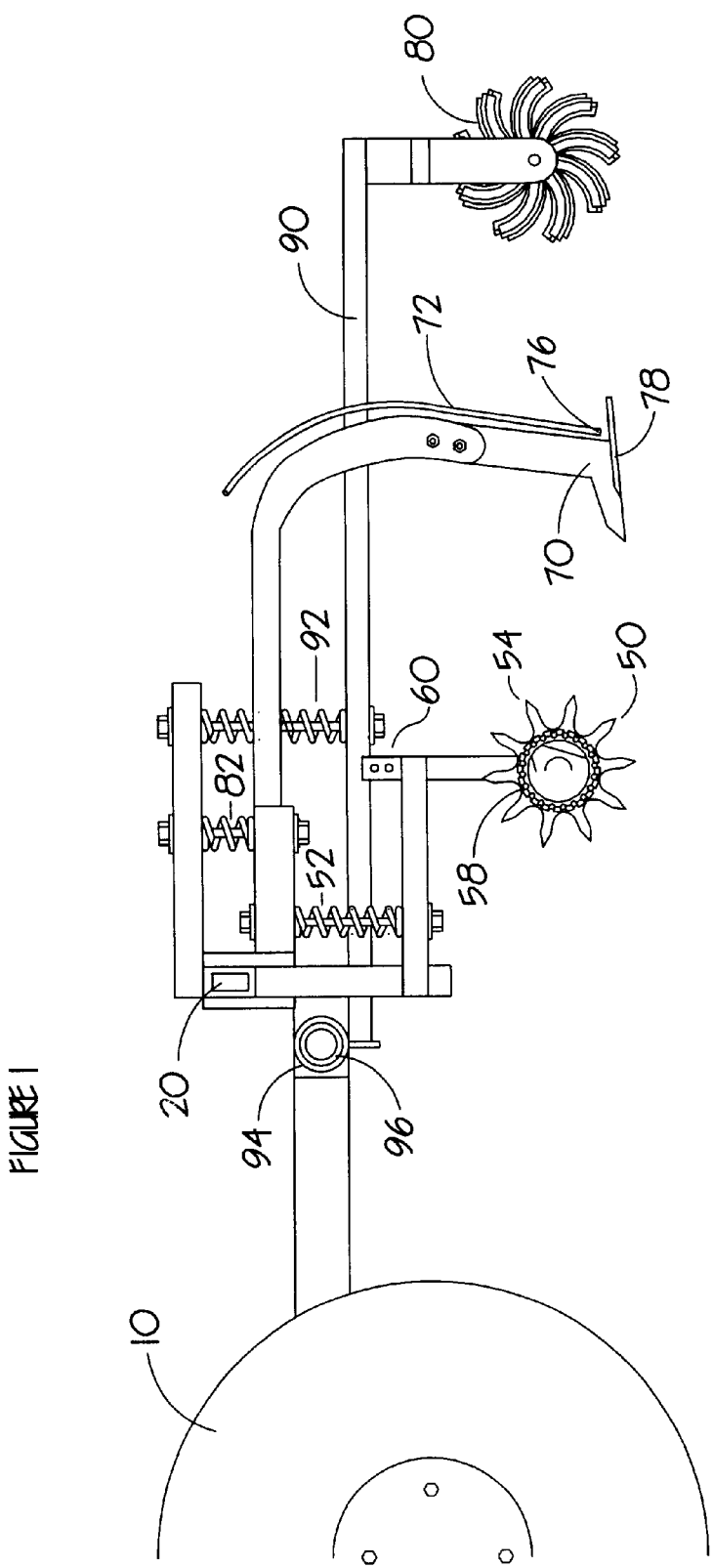
FIG. 1 Shows each component of the invention attached to a toolbar pulled by a tractor FIG. 2 Shows details of the anhydrous knife

Referring to FIG. 1, a conventional tractor (10) is partially shown. The tractor (10) is attached to a tool bar (20) that supports the various elements of the device. The tool bar can be supported by wheels or by a three-point hitch not shown.

The soil working implements include a row cleaner (50) of conventional design. The row cleaner (50) includes two wheels set at angles to the direction of travel of the tractor. The spring (52) allows the row cleaner to flex over obstacles such as rocks. Fingers (54) spaced along the edges of two wheels tend to cut and throw old plant material out of the path of travel while depth is controlled by cone sections (58).

A knife (70) is co-mounted to the tool bar (20) along with the row cleaner (50). The knife includes a liquid supply tube (72) that delivers liquid fertilizer from a tank (not shown) mounted on the tool bar (20) or pulled behind the tool bar.

The supply tube (72) delivers liquid to the nozzles (76) along the back edge of the knife. Wings (78) on the knife tend to lift and fluff the soil in preparation for the application and rapid disbursement of the liquid. The knife can be mounted to the toolbar with a spring (82) that allows the device to hit rocks underground without breaking off. The row cleaner (50) travels in front of the knife (70) and is depth adjustable using a sliding bar (60) and hole arrangement.

Rolling cultivator gangs (80) follow the knife and are used to further build the seed bed. The rolling cultivators are mounted to a bar (90). The bar (90) is mounted to a spring (92) and a rotatable pipe section (94) that allow the bar (90) to pivot about the fixed pipe section (96) if one of the two cultivator gangs hit a rock. Typically the rolling cultivator consists of a gang of 3–5 tine sets. Each set is rotatable but by setting the direction of rotation at an angle to the direction of tractor travel, the rolling cultivator tends to pile up a hill of soil. One set of cultivator gangs (80) are mounted on each bar (90) and a pair of gangs are set at opposite angles on each side of the row so that they tend to pile some soil along the same path back on the row.

Figure 2:
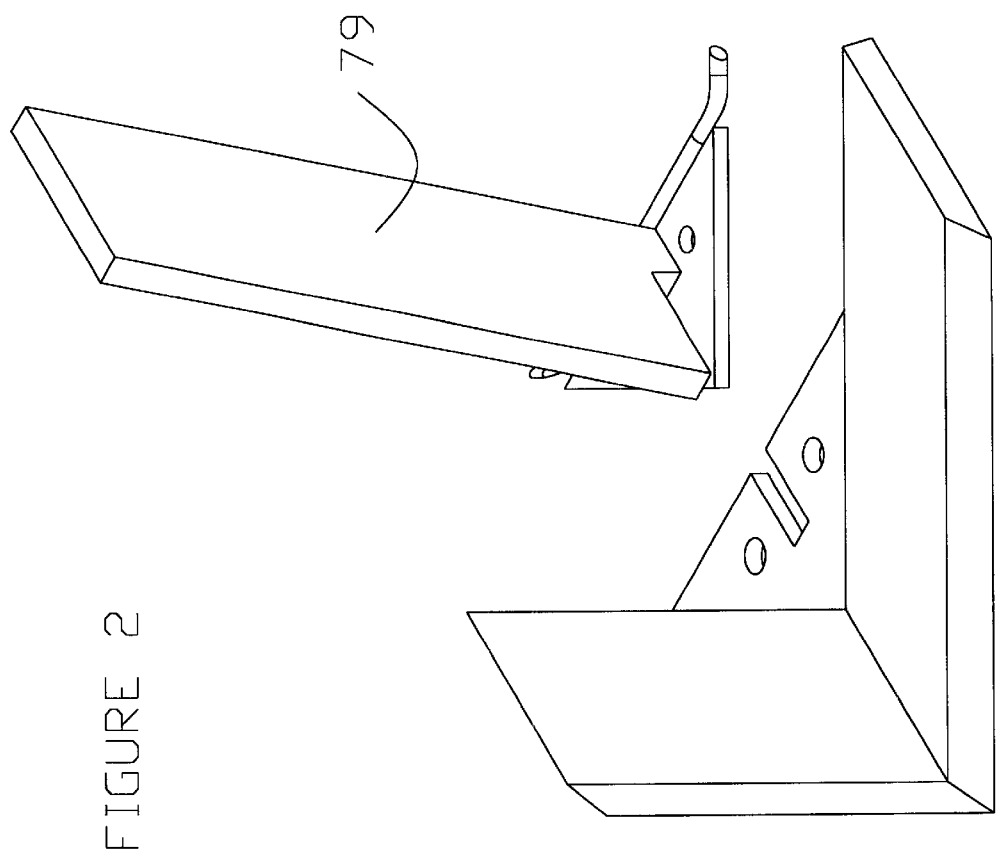

FIG. 2 shows additional details of the anhydrous knife that allow it to achieve a uniform dissipation of liquid fertilizer. As can be seen the knife (70) assembly consists of a central blade (79) with wings (78) bolted to it. The supply nozzle (76) is attached to the central blade (79) and separates the stream of liquid from the supply tube (72) into two streams at the back edge of the knife. The streams are pointed out along the backside of each wing (78). This arrangement allows for maximum distribution of the liquid fertilizer under the seedbed as the knife is pulled along. The wings open up the soil and the supply nozzle sprays a stream of fertilizer into the space as it is created.

Although not shown it is conventional that the tractor (10) would pull multiple sets of all implements, mounted side by side, as dictated by the power of the tractor and space available on the tool bar.

In operation, the tractor (10) pulls the tool bar (20), which carries the various ground working implements. As the device travels down a row, the row is first cleaned by the fingers (54) of the row cleaner (50). Careful setting of the angle of the row cleaner wheels and their depth allows the old plant material to be pulled just off the row but keeps enough near the row to prevent soil erosion. The knife (70) is usually set so that the wings (78) are at several inches under the soil so that it breaks up and raises the seedbed as it is pulled through the ground. Liquid fertilizer is delivered to the knife (70) through the tube (72) from the tank (not shown). The liquid fertilizer is spread out across the back of the knife by nozzle (76) which creates streams of liquid that travel away from the central blade (79). Dissipation of the liquid into the soil is hastened by the voids created by the knife. Then the gangs of rolling cultivators pass through tending to pull some ground cover back onto the row while further raising the seedbed and filling in any furrow left by the central blade (79).

Although the best embodiment know has been disclosed, variations in the design are possible. For example a coulter wheel could be added to further chop vegetation and break up the soil.

What is claimed is:

1. A strip till farming implement having a normal direction of travel and including;

a knife mounted to a movable tool bar; said knife adjustably mounted and normally set to travel several inches below the soil;

said knife having a central blade with a back edge and two wings mounted to said central blade; a supply tube for transferring liquid fertilizer from a supply to the back edge of said central blade; means including supply tubes running along the back edge of each wing to spread the liquid fertilizer behind the wings as said knife is pulled through said soil to dissipate said liquid through the soil; a row cleaner, mounted to said tool bar; said row cleaner having finger means to partially clear old plant material from a row of soil to be planted and a rolling gang tine cultivator pulled behind said knife said rolling tine cultivator moving soil onto the seed bed.

2. A strip till farming implement having a normal direction of travel and including;

a knife mounted to a movable tool bar; said knife adjustably mounted and set to travel several inches below the soil;

said knife having a central blade with a back edge and wings mounted to said central blade, a supply tube for transferring liquid fertilizer from a supply to the back edge of said central blade; supply tubes means along the back edge of each wing to spread the liquid fertilizer behind the wings as said knife is pulled through said soil to dissipate said liquid through the soil; a row cleaner leading said knife, said row cleaner having finger means to partially clear old plant material from a row of soil to be planted and a rolling gang tine cultivator pulled behind said knife said rolling tine cultivator moving soil onto the seed bed.

* * * * *